United States Patent
Chan et al.

(10) Patent No.: US 7,095,812 B2
(45) Date of Patent: Aug. 22, 2006

(54) REDUCED COMPLEXITY RECEIVER FOR SPACE-TIME- BIT-INTERLEAVED CODED MODULATION

(75) Inventors: Albert Chan, Cambridge, MA (US); Inkyu Lee, Kearny, NJ (US); Carl-Erik Wilhelm Sundberg, Chatham, NJ (US)

(73) Assignee: Agere Systems Inc., Allentown, PA (US)

( * ) Notice: Subject to any disclaimer, the term of this patent is extended or adjusted under 35 U.S.C. 154(b) by 784 days.

(21) Appl. No.: 10/178,922

(22) Filed: Jun. 24, 2002

(65) Prior Publication Data
US 2004/0001564 A1    Jan. 1, 2004

(51) Int. Cl.
H03D 1/00    (2006.01)
H04L 27/06   (2006.01)

(52) U.S. Cl. .................. 375/341; 375/262; 714/786
(58) Field of Classification Search ............. 375/341, 375/331
See application file for complete search history.

(56) References Cited

U.S. PATENT DOCUMENTS

| | | | | |
|---|---|---|---|---|
| 4,742,533 A | * | 5/1988 | Weidner et al. | 375/331 |
| 5,291,137 A | * | 3/1994 | Freedman | 324/303 |
| 2001/0033614 A1 | * | 10/2001 | Hudson | 375/229 |

OTHER PUBLICATIONS

Andrea M. Tonello, Space-Time Bit Interleaved Coded Modulation with an Iterative Decoding Strategy, Sep. 2000, IEEE VTC 2000, pp. 473-478.*
Bernard Widrow and Samuel Stearns, Adaptive Signal Processing, Prentice-Hall, 1985.*
A van Zelst et al, Turbo-Blast and its Performance, May 2001, IEEE VTC 2001 Spring, pp. 1282-1286.*
Andrea M. Tonello, Performance of Space-Time Bit Interleaved Codes in Fading Channels with Simplified Iterative Decoding, May 2001, IEEE VTC 2001 Spring, pp. 1357-1361.*
Stephan ten Brink, Iterative Decoding for Multicode CDMA, IEEE VTC 1999, pp. 1876-1880, May 1999.*
"Lattice Code Decoder for Space-Time Codes" by Oussama Damen, etal; IEEE Communications Letters, vol. 4, No. 5, May 2000.
"Space-Time Bit-Interleaved Coded Modulation With An Iterative Decoding Strategy" by Andrea M. Tonello; Proceedings, VTC 2000 Fall, Boston, MA, Sep. 2000, pp. 473-478.

* cited by examiner

*Primary Examiner*—Jay K. Patel
*Assistant Examiner*—Adolf DSouza

(57) ABSTRACT

A system employs space-time coding characterized at the transmitter by bit-interleaved coded modulation (BICM) combined with modulating several streams of the BICM encoded data for transmission over two or more antennas. Space-time coding techniques improve transmission efficiency in radio channels by using multiple transmit and/or receive antennas and coordination of the signaling over these antennas. Bit-interleaved coded modulation provides good diversity gain with higher-order modulation schemes that employ binary convolutional codes. A receiver demodulates the received signals and applies multi-input, multi-output (MIMO) demapping to estimate the BICM encoded bitstream. After deinterleaving of the BICM encoded bitstream, maximum a posteriori (MAP) decoding is applied to the resulting bit stream to generate soft output values. By applying well-known turbo-decoding principles to iteratively demap and decode, the overall receiver performance is significantly improved. The MIMO demapping and MAP decoding processes exchange likelihood information to improve the bit error rate performance over several iterations of demapping/decoding. By generating tentative decisions for transmitted bits, the overall number of evaluations used for demapping may be reduced.

17 Claims, 5 Drawing Sheets

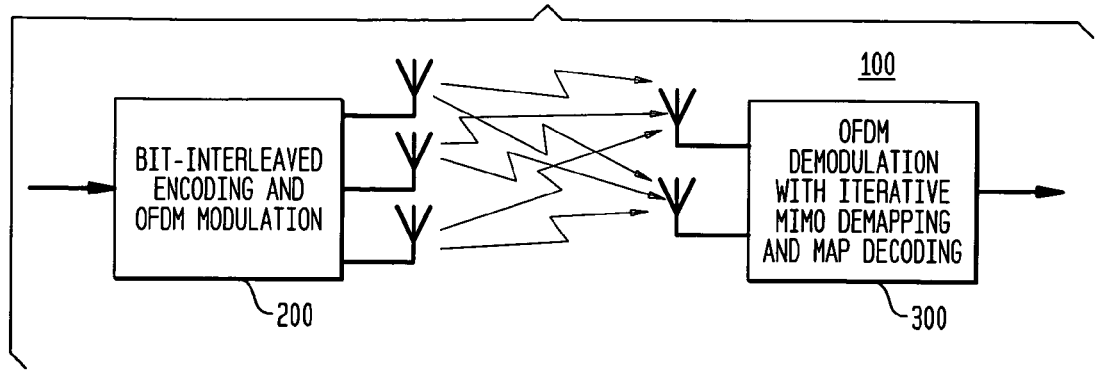
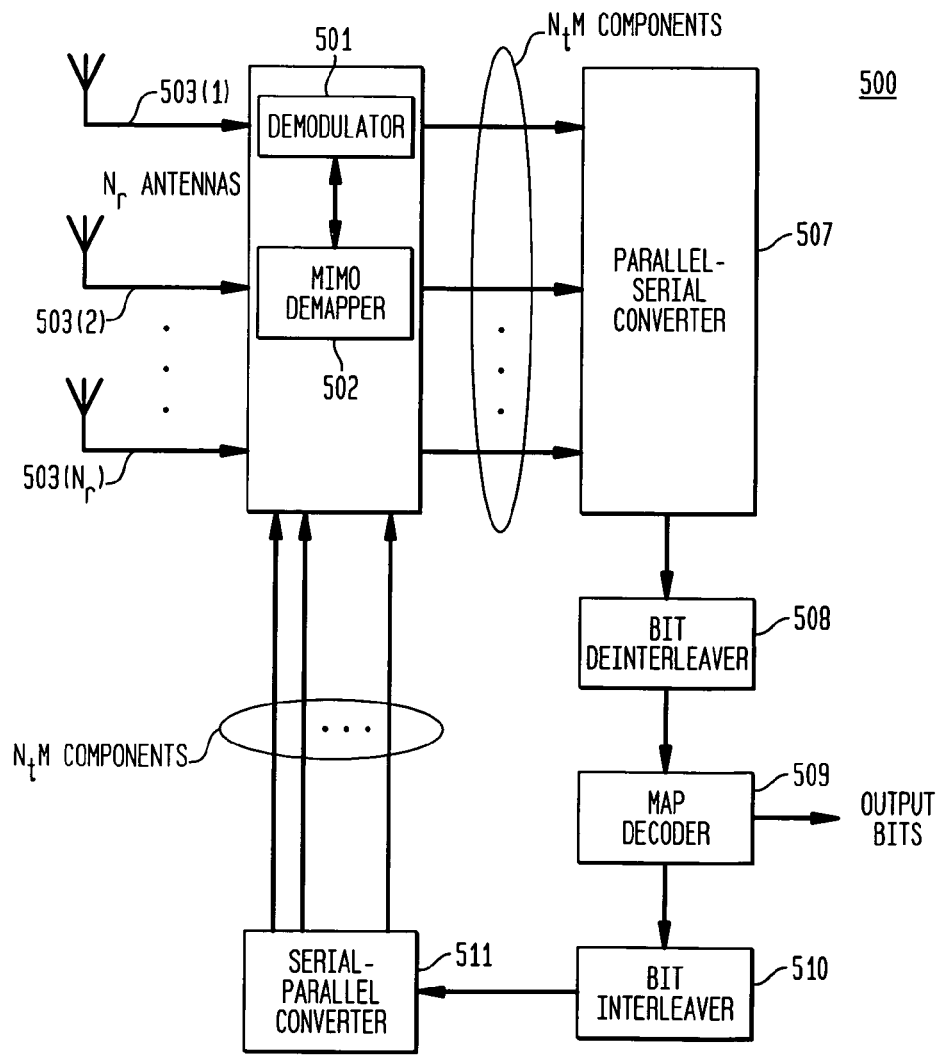

REDUCED COMPLEXITY RECEIVER FOR SPACE-TIME- BIT-INTERLEAVED CODED MODULATION

BACKGROUND OF THE INVENTION

1. Field of the Invention

The present invention relates to data modulation and demodulation in a communication network, and, more particularly, to space-time coding and decoding techniques for wideband data channels.

2. Description of the Related Art

Wireless channels exhibit a number of severe impairments, among which fading is one of the most severe. For narrowband channels, the fading can often be assumed to be flat, while for wideband channels the fading is typically frequency selective. In addition, additive noise and interference contribute significantly to signal degradation. Diversity is a method to improve transmission over fading channels. Time diversity uses encoding to duplicate and spread information through an encoded bit stream (e.g., convolutional encoding) and space diversity employs multiple transmit and/or receive links to duplicate and spread information over multiple signal paths.

Coded modulation systems employ methods that utilize time diversity. Encoded data is transmitted through the path between a single transmit antenna and a single receive antenna. Some methods efficiently utilize binary convolutional codes to obtain diversity gains with higher-order, non-binary modulation symbols (e.g., 16-QAM), such as bit-interleaved coded modulation (BICM) systems using multi-level coding methods (and corresponding multistage decoding at the receiver). For example, BICM systems provide diversity gains, and, for example, higher-order, coded modulation systems use well-known binary convolutional codes separated by interleaving to encode the data. Further improvements in system performance are obtained by iterative demapping (translation of symbols to bits) and decoding at the receiver. More recently, so-called space-time coding methods have been proposed to obtain both space and time diversity by using multiple transmit and/or receive antennas along with matching coding. For example, a space-time BICM scheme for narrowband radio channels employing multiple transmit antennas in flat fading cases is described in A. M. Tonello, "Space-Time Bit-Interleaved Coded Modulation With An Iterative Decoding Strategy," Proceedings, VTC 2000 Fall, Boston, Mass., September 2000, pp473–478, which is incorporated herein in its entirety by reference.

Orthogonal Frequency Division Multiplexing (OFDM) is a form of data transmission in which a block of data is converted into a parallel form and mapped into frequency domain symbols. To generate a time domain signal for transmission over the antenna link between antennas, the inverse discrete Fourier transform (IDFT, or its fast version, the IFFT) of length F is applied to F frequency domain symbols to create F subchannels (also known as F subcarriers, since each channel is a separately modulated carrier). Each of the F subcarriers is orthogonal to each other while the frequency spectrum overlaps. The frequency spacing between the F subcarriers is minimum in OFDM, giving OFDM high spectral efficiency. At the receiver, the discrete Fourier transform (DFT, or its fast version, the FFT) is applied to the received signal over F subchannels to generate a sequence of values representing estimated frequency domain symbols. Demapping maps the estimated symbols back to the original block of user data (bits). OFDM allows for wideband transmission over frequency selective (radio) channels without adaptive equalizers. For wideband systems, OFDM has been proposed for a wide range of radio channel applications. One application is the wireless local Area Network (LAN) system defined by the IEEE 802.11a standard. This standard adopts OFDM in packet-based communications operating in unlicensed 5 GHz bands.

SUMMARY OF THE INVENTION

In accordance with embodiments of the present invention, a receiver applies an iterative demapping and decoding process to a received signal encoded with space-time coding. The space-time coding is characterized by coded modulation of user data, such as bit-interleaved coded modulation (BICM), combined with modulation of the encoded user data for transmission over one or more antennas. The receiver demodulates the received signals from at least two antennas, and applies multi-input, multi-output (MIMO) demapping to estimate the (e.g., BICM) encoded bitstream. After deinterleaving of the estimated encoded bitstream, maximum a posteriori (MAP) decoding is applied to the resulting bit stream to generate soft output values. The MIMO demapping and MAP decoding processes exchange likelihood information to improve the bit error rate performance over several iterations of demapping/decoding. By generating a set of tentative decisions, the overall number of evaluations used for demapping may be reduced. Since no likelihood values are available for the first iteration of demapping and decoding, minimized cost function error (MCFE) estimates (e.g., minimum mean square estimates (MMSE)) of the transmitted symbols are generated, along with likelihood values and probabilities of correct decision for the MMSE estimates. Based on the probabilities of correct decision, a set of (reliable) hard bit decisions is determined. For subsequent iterations, the likelihood values of MAP decoding are employed to determine the set of (reliable) hard bit decisions.

In accordance with an exemplary embodiment of the present invention, a receiver iteratively demaps and decodes two or more received signals into data by, for a first iteration, (a) demapping, with a multi-input, multi-output (MIMO) demapper, a sequence of encoded data from the received signals as a set of MCFE estimates; (b) generating MCFE likelihood values for the set of MCFE estimates based on a set of corresponding variances; (c) calculating, for the set of MCFE estimates, a set of probabilities of correct decision based on the MMSE likelihood values; (d) setting one or more of the set of MCFE estimates as hard decisions based on the set of probabilities of correct decision; and (e) calculating a set of maximum a posteriori (MAP) likelihood values based on the remaining MMSE estimates.

BRIEF DESCRIPTION OF THE DRAWINGS

Other aspects, features, and advantages of the present invention will become more fully apparent from the following detailed description, the appended claims, and the accompanying drawings in which:

FIG. 1 shows a coded modulation system employing one or more embodiments of the present invention;

FIG. 5 shows a receiver employing reduced complexity iterative demapping/decoding in accordance with an alternative exemplary embodiment of the present invention.

DETAILED DESCRIPTION

Figure 2:
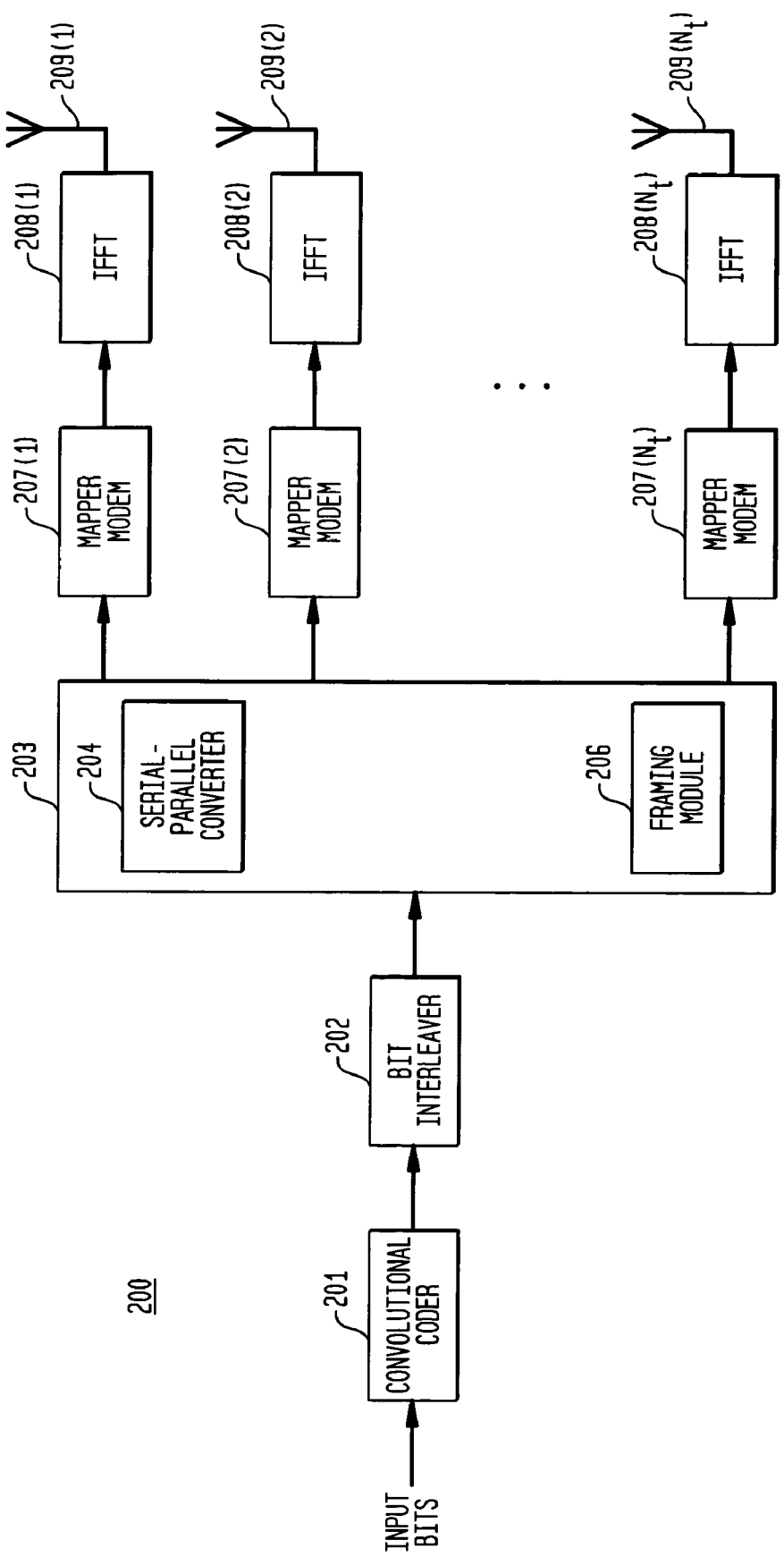
FIG. 2 shows an exemplary embodiment of the transmitter shown in FIG. 1.

FIG. 1 shows a coded modulation system 100 employing one or more embodiments of the present invention. Coded modulation system 100 is characterized by transmitter 200 applying space-time coding with bit-interleaved coded modulation that is combined with a multi-carrier OFDM modulation; and receiver 300 applying OFDM demodulation with iterative demapping and decoding. Such coded modulation systems in accordance with the present invention may be advantageously employed in wireless local/wide area network (LAN/WAN) applications.

FIG. 1 shows an example of a system with 3 transmit antennas and 2 receive antennas, and a system model may be defined for the general case of $N_t$ transmit antennas ($N_t$ an integer and $N_t \geq 2$) and $N_r$ receive antennas ($N_r$ an integer and $N_r \geq 1$). Each of the $N_r$ receive antennas receives signals from the $N_t$ transmit antennas.

While the exemplary embodiment is described for space-time coding with bit-interleaved coded modulation, other types of coded modulation for space-time coding may be employed. In addition, the exemplary embodiments are described for a mapping of the bit-interleaved coded data into symbols using a modem constellation. Such modem constellation may be m-ary PSK or m-ary QAM with m constellation points, though the present invention is not limited to these constellations and may employ any multi-level signal point modulation. System 100 employs OFDM for wideband channels using F subcarriers rather than single carrier modems. The spectral efficiency of system 100 is $R_C N_t \log_2 m$ bits/s/Hz, where $R_C$ is the rate of the convolutional code used.

The output $y_{k,l}^j$ at the kth subcarrier and at the lth time slot from the jth receive antenna matched filter after the discrete Fourier transform (DFT, or its fast version, the FFT) is given by equation (1):

$$y_{k,l}^j = \sqrt{E_s} \sum_{i}^{N_i} H_{k,l}^{i,j} x_{k,l}^i + n_{k,l}^i \quad \text{for } j = 1, 2, \ldots N_r \tag{1}$$

where $x_{k,j}^i$ is the transmitted symbol (of a multi-level symbol constellation) at the ith transmit antenna at the kth subcarrier and at the lth time slot. The value $E_s$ is defined as the symbol energy and $H_{k,j}^{i,j}$ is defined as the equivalent channel frequency response of the link between the ith transmit antenna and jth receive antenna at the kth subcarrier and at the lth time slot. The quantity $n_{k,j}^j$ represents the additive noise contribution, which is represented as a sequence of i.i.d. complex, zero-mean, Gaussian variables with variance $N_o/2$ per dimension.

The time domain channel impulse response between the ith transmit and jth receive antenna may be a frequency selective channel that may be modeled as defined in equation (2):

$$h^{i,j}(t, \tau) = \sum_{n=1}^{K} \bar{h}^{i,j}(n, t)\delta(\tau - \tau_n) \tag{2}$$

where the channel coefficients $\bar{h}^{i,j}$ (n,t) are complex Gaussian variables with zero mean (Rayleigh fading). The term $\delta(\cdot)$ is defined as the Dirac delta function, and K denotes the number of channel (filter) taps.

The channel impulse responses of each of the antenna links are independent of one another. Both fast fading (i.e., uncorrelated fading coefficients in time) and block fading (i.e. static fading coefficients over a block of transmitted symbols, independent over blocks) may be present. For the described embodiments, the model is described using block fading typical of wireless LANs with slow movements. Consequently, the variables with respect to time indices 1 and t may be considered constant and these indices are omitted from the following description for clarity.

The channel frequency response in equation (1) may be expressed as given in equation (3):

$$H_k^{i,j} = \sum_{n=1}^{K} \bar{h}^{i,j}(n) e^{-j2\pi k \tau_n / FT} \tag{3}$$

where T denotes the sampling period. The absolute magnitude of the channel frequency response, $|H_k^{i,j}|$, is Rayleigh distributed.

The symbol constellation is normalized such that equation (4) holds true:

$$E\{|x_k^i|^2\} = 1 \text{ for } i = 1, 2, \ldots N_t \tag{4}$$

With vector notations, equation (2) may be expressed as in equation (5):

$$y_k = \begin{bmatrix} y_k^1 \\ \vdots \\ y_k^{N_T} \end{bmatrix} = \sqrt{E_s} \begin{bmatrix} H_k^{1,1} & \cdots & H_k^{N_i,1} \\ \vdots & \ddots & \vdots \\ H_k^{1,N_T} & \cdots & H_k^{N_i,N_T} \end{bmatrix} \begin{bmatrix} x_k^1 \\ \vdots \\ x_k^{N_i} \end{bmatrix} + \begin{bmatrix} n_k^1 \\ \vdots \\ n_k^{N_T} \end{bmatrix} \tag{5}$$

or equivalently as in equation (5'):

$$y_k = \sqrt{E_s} H_k x_k + n_k \text{ for } k = 1, 2, \ldots F \tag{5'}$$

Generally, receiver 300 includes circuitry that estimates the values for the elements in channel response matrix $H_k$, and such estimates may be generated using periodic test signals transmitted by transmitter 200 to receiver 300. Such a priori information of the channel impulse response may also be generated via simulations.

FIG. 2 shows transmitter 200 for space-time coding with bit-interleaved coded modulation (BICM) with OFDM modulation for the case of wideband frequency selective channels. Transmitter 200 comprises convolutional encoder 201, bit interleaver 202, processing module 203, mapper modems 207(1)–207($N_t$), inverse fast Fourier transform (IFFT) modules 208(1)–208($N_t$), and transmit antennas 209(1)–209($N_t$).

Applying BICM encoding to the data is as follows. Convolutional coder 201 applies a binary convolutional code with rate $R_C$ to the input bits (input data). Bit interleaver 202 then interleaves the encoded bits from convolutional coder 201 to generate BICM encoded data. Bit interleaving by interleaver 202 de-correlates the fading channel, maximizes diversity, removes correlation in the sequence of convolutionally encoded bits from convolutional coder 201, and conditions the data for increased performance of iterative decoding. Convolutional coder 201 and bit interleaver 202 may typically operate on distinct blocks of input data, such as data packets.

Applying OFDM to the BICM encoded data is as follows. Processing module 203 includes serial-to-parallel converter 204, and optional framing module 206. Serial-to-parallel converter 204 receives the serial BICM encoded bitstream from bit interleaver 202, which bitstream may have framing information inserted in the bitstream by framing module 206. Optional framing information allows a receiver to synchronize its decoding on distinct blocks of information. Serial-to-parallel converter 204 generates a word of length $N_t$ long, with each element of the word provided to a corresponding one of mapper modems 207(1)–207($N_t$). Elements of the word may be single bit values, or may be b bit values where b is the number of bits represented by each modem constellation symbol.

Mapper modems 207(1)–207($N_t$) each convert b bits to corresponding symbols (of the m-ary symbol space) in the sequence $x_k^j$ of equations (5), and (5'). The output of the $j^{th}$ modem mapper 207 ($j$) is a symbol. IFFT modules 208(1)–208($N_t$) each collect up to F symbols, and then apply the IFFT operation of length F to the block of F symbols. Thus, IFFT modules 208(1)–208($N_t$) each generate F parallel subchannels that may be transmitted over corresponding antennas 209(1)–209($N_t$). Each subchannel is a modulated subcarrier that is transmitted to the channel.

Figure 3:
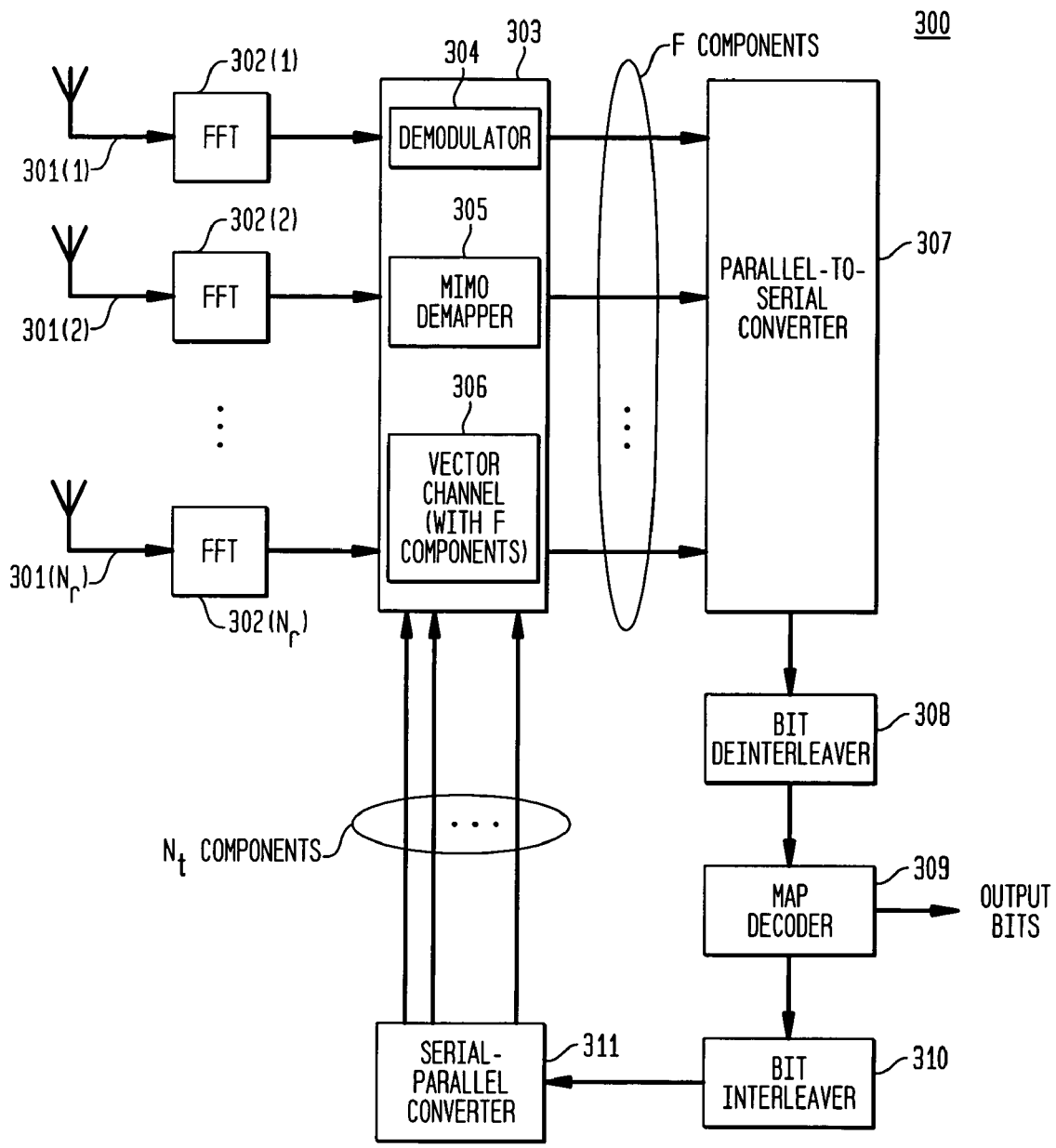
FIG. 3 shows an exemplary embodiment of the receiver shown in FIG. 1.

FIG. 3 shows receiver 300 an iterative decoder for the space-time code for the OFDM system. Receiver 300 comprises receive antennas 301(1)–301($N_r$), fast Fourier transform (FFT) modules 302(1)–302($N_r$),demodulator/detector 303, parallel-to-serial converter 307, bit deinterleaver 308, maximum a posteriori (MAP) decoder 309, bit interleaver 310, and serial-to-parallel converter 311.

For a wideband system, receiver 300 performs OFDM demodulation for each of receive antennas 301(1)–301($N_r$), and the demodulation and demapping is performed over F parallel subchannels. The ith receive antenna 301($i$) senses a signal made up of various contributions of the signals transmitted from the $N_t$ transmit antennas (i.e., contributions of the multiple F parallel, narrowband, flat fading subchannels transmitted over corresponding antennas 209(1)–209($N_t$) of FIG. 2). FFT modules 302(1)–302($N_r$) each apply an F-point FFT to the corresponding signals of receive antennas 301(1)–301($N_r$), generating $N_r$ parallel sets of F subchannels.

In accordance with embodiments of the present invention, demodulator/detector 303 estimates bits in each of the F subchannels (slowly varying with flat fading) rather than in only one subchannel as in the narrowband, flat fading systems of the prior art. Demodulator 304 demodulates F subchannel carriers to baseband for each of the $N_r$ parallel sets of F subchannels. Multi-input multi-output (MIMO) demapper 305, based on the $N_r$ parallel sets of F subchannels from FFT modules 302(1)–302($N_r$) produces MAP estimates of the demapped bits (i.e, bits mapped from the constellation symbol) in each of the F subchannels from the $N_t$ antennas in the transmitter. MIMO demapper 305 produces the MAP estimates of the demapped bits using reliability information generated by MAP decoding of the MAP estimates for the BICM values by MAP decoder 309.

Estimation of bit values by MIMO demapper 305 is now described. MIMO demapper 305 computes soft values for bits transmitted on the overlapping F subchannels, along with an a posteriori probability of the soft value being correct. The a posteriori probability of the soft value being correct is defined as an a posteriori log-likelihood ratio (LLR) for the soft value (bit). Defining $d_k^{i,m}$ as the bit that is mapped at the kth subcarrier into the mth bit position (m=1, 2 ... M, where M is the integer number of bits per symbol) of the constellation symbol of the ith transmit antenna, i1, 2, ... $N_t$, then the a posteriori LLR L ($d_k^{i,m}$) for the soft value corresponding to bit $d_k^{i,m}$ is given as in equation (6):

$$L(d_k^{i,m}) = \log \frac{P(d_k^{i,m} = +1)}{P(d_k^{i,m} = -1)}. \tag{6}$$

The set $S_d^{i,m}$, d=+1 or −1, is defined as the set of all symbol vectors with a +1 or −1 value for bit $d_k^{i,m}$, respectively. The number of elements in such a set is $2^{N_tM}$. The LLR in equation (6) conditioned on the channel state information $H_k$ is given in equation (7):

$$\log \frac{P(d_k^{i,m} = +1 \mid y_k, H_k)}{P(d_k^{i,m} = -1 \mid y_k, H_k)} = \log \frac{\sum_{x_k \in S_{+1}^{i,m}} p(x_k, y_k, H_k)}{\sum_{x_k \in S_{-1}^{i,m}} p(x_k, y_k, H_k)} \tag{7}$$

A MIMO demapper considers all $2^{N_tM}$ combinations of overlapping bits in a subchannel and then evaluates the LLR for each combination. Soft values are assigned as the combinations that exhibit the highest probability of occurrence with respect to the LLR values. For system 100, the complexity (number of combinations evaluated) is approximately $2^{N_tM}$. Thus, assuming a transmitted vector of symbol bits $x_k$ a vector of observations at the receiver $y_k$, and the known estimated channel function $H_k$, the soft output values for bits may be generated by calculating the LLR of equation (7) for all combinations and selecting the combination having the highest LLR values.

Figure 4:
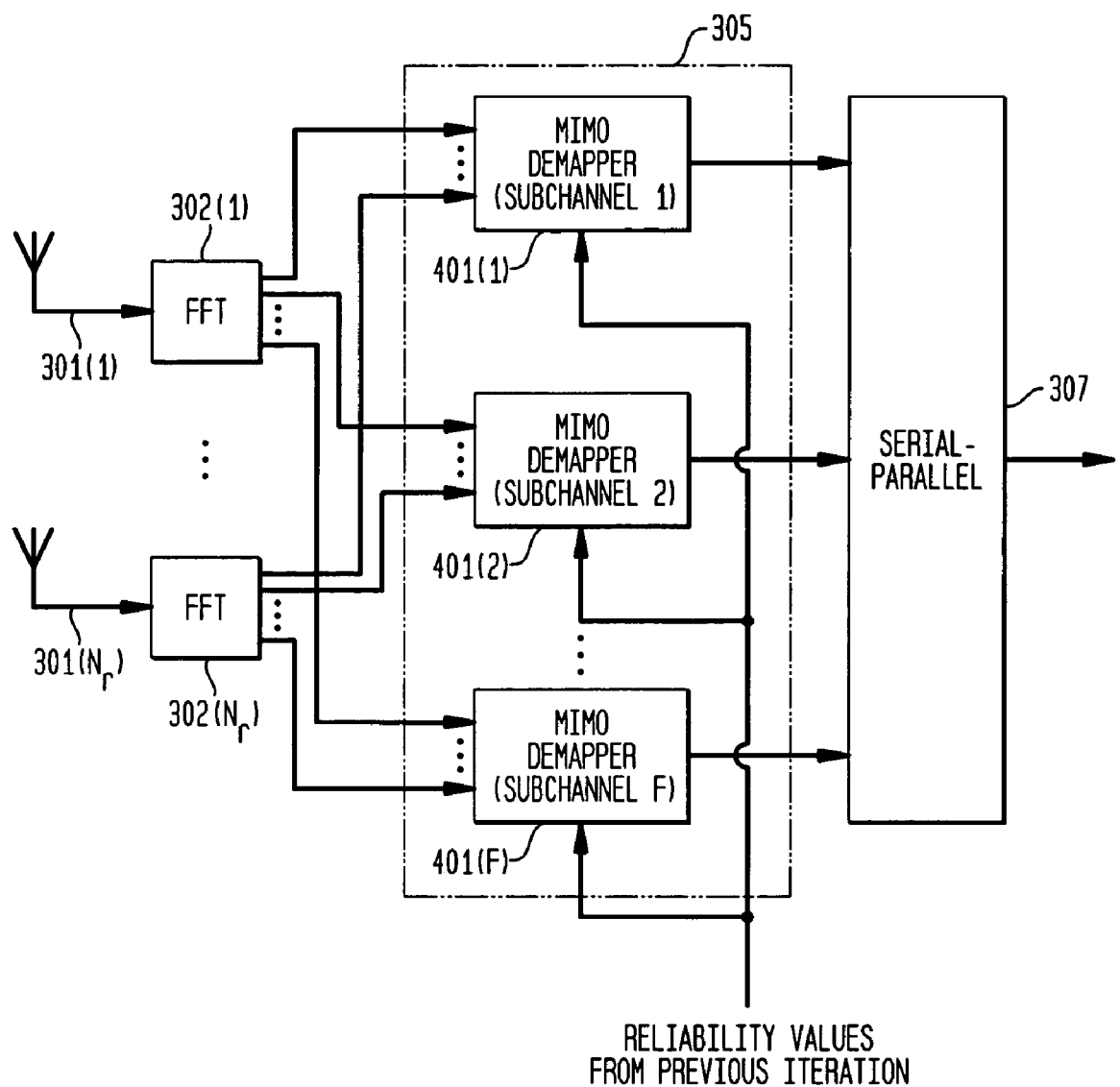
FIG. 4 shows an exemplary embodiment of the multi-input, multi-output (MIMO) demapper shown in FIG. 3.

MIMO demapper 305 in FIG. 3 is shown in FIG. 4. Each signal of the $N_r$ receive antennas 302(1)–302($N_r$) is divided into F subchannels (via demodulator 304, not shown in FIG. 4) by applying the FFT and sent to corresponding subchannel MIMO demappers 401(1)–401(F). The signal outputs of the kth subchannel for all $N_r$ receive antennas are provided to the kth subchannel MIMO demapper 401($k$), which computes the log likelihood ratio of equation (7) using extrinsic information (a likelihood ratio vector $L_k^e$) generated from the output of MAP decoder 309 of the previous iteration. Instead of the parallel structure shown in FIG. 5, it is possible to process the signals output from each of FFT modules 302(1)–302($N_r$) sequentially by buffering the output and processing them one by one with only one MIMO demapper.

In order to generate a value for the LLR of equation (7), the joint probability density $p(x_k,y_k,H_k)$ of equation (7) is evaluated. The joint probability density $p(x_k,y_k,H_k)$ of equation (7) is proportional to ($\propto$) the quantity of equation (8):

$$p(x_k, y_k, H_k) \propto \exp\left(-\frac{1}{N_0}\|y_k - H_k x_k\|^2 + \frac{1}{2}d_k^T L_k^e\right) \quad (8)$$

where $d_k$ is a column vector comprising elements $d_k^{l,m}$ and $L_k^e$ is the extrinsic information column vector representing a priori log likelihood ratio (LLR) values for the bits from MAP decoder 309. The extrinsic information (the a priori LLR vector $L_k^e$) is exchanged between MIMO demapper 305 and MAP decoder 309 to improve the bit error rate performance for each iteration. The elements of the a priori LLR vector $L_k^e$ may be independent variables in the interleaved bit stream.

For the first iteration (i.e., the first pass through the iterative detection and decoding process) the elements of the a priori LLR vector $L_k^e$ are set to zero. For each subsequent iteration, the elements of the a priori LLR vector $L_k^e$ are derived from the MAP decoding process of MAP decoder 309.

Returning to FIG. 3, the estimates of bits in F parallel streams from MIMO demapper 305 are provided to parallel-to-serial converter 307 which reconstitutes receiver 300's estimate of the BICM encoded bitstream generated by the transmitter. The estimated BICM encoded bitstream is then deinterleaved by bit deinterleaver 308 and applied to MAP decoder 309 to reverse the convolutional encoding applied by the transmitter.

The MAP decoding process generates soft output values for transmitted information bits. The MAP decoding process employs input a priori LLR values for decoding. The input a priori LLR values to MAP decoder 309 are extrinsic information from MIMO demapper 305, which is the difference between 1) the input LLR values $L_k^e$ to MIMO demapper 305 for the encoded information bits and 2) the output LLR values $L_k$ having elements $L(d_k^{l,m})$ calculated from equation (7) for the estimates for encoded information bits. For MAP decoding, the a posteriori log-likelihood ratio (LLR) value $L(u_i)$ for a user's bit $u_i$ at time i (for either a decoded or a new/improved encoded information bit) given an observation (channel output sample) $y_i$ may be calculated as given in equation (9):

$$L(u_i) = \log\left(\frac{p(u_i = +1 \mid y_i)}{p(u_i = -1 \mid y_i)}\right) \quad (9)$$

The a priori LLR vector $L_k^e$ applied to the kth subchannel MIMO demapper 401(k) is formed from extrinsic information of MAP decoding. Extrinsic information for a bit is defined as the difference between 1) the input a priori LLR value to MAP decoder 309 for the encoded information bit (extrinsic information from the MIMO demapper) and 2) the output a posteriori LLR value for the encoded information bit (e.g., generated through equation (9)). However, after forming the difference, the extrinsic information from MAP decoder 309 is first applied to bit interleaver 310. Bit interleaving aligns elements of the extrinsic information with the interleaved estimated BICM encoded bitstream from MIMO demapper 305. In addition, the interleaved extrinsic information is applied to serial-to-parallel converter 311, which forms $N_t$ parallel streams of extrinsic information corresponding to the parallel bit streams formed at the transmitter. Vector Channel module 306 then forms the a priori LLR column vector $L_k^e$ for each of the F subchannels from the $N_t$ parallel streams of extrinsic information.

The extrinsic information is exchanged between MIMO demapper 305 and MAP decoder 309 to improve the bit error rate performance for each iteration. The elements of the a priori LLR vector $L_k^e$ may be considered as independent variables in the interleaved bit stream.

However, for calculation of the LLR value of equation (7), the cardinality of the set $S_d^{l,m}$ is $2^{N_tM}$. Thus, $2^{N_tM}$ sequence evaluations are made, which number of evaluations grows exponentially with the product of the number of transmit antennas $N_t$ and the number of bits per constellation symbol (signal point) M. To improve speed of decoding and decrease both circuit size and power consumption of an implementation, it is desirable to reduce the number of calculations during the evaluations. For a first level of complexity reduction without significant loss of performance, a Max-Log approximation for calculation of LLRs may be used in both a MIMO demapper and in a MAP decoder for the convolutional code. The Max-Log approximation for calculation of a posteriori LLR values may employ the max* term relationship of equation (10):

$$\max^*(x,y) = \log(e^{-x} + e^{-y}) = \max(x,y) + \log(1 + e^{-|x-y|}) \quad (10)$$

when calculating updated forward recursive, reverse recursive, and branch metrics sequences to calculate the value of equation (6). Each constituent MIMO demapper or MAP decoder thus calculates the max* term by separate calculation of a max term (max(x,y)) and a logarithmic correction term $(\log(1+e^{-|x-y|}))$.

For a second level of complexity reduction, the number of evaluations is reduced. One method by which the number of evaluations is reduced employs LLR values of a previous iteration to identify a number P of bit soft output values that may be fixed as hard decisions. Fixing hard decisions reduces the number of sequence vectors (possible symbol sequence combinations) that are evaluated during either demapping or decoding. However, since the a priori LLR values as described previously are set to zero, embodiments of the present invention employ a separate method to estimate LLR values for the first iteration. In a first iteration of demapping and decoding, a minimized cost function error estimation, such as the minimum mean square error estimation, is used to determine the P soft output values that are to be fixed.

The techniques described herein for a low complexity receiver need not be limited to a system employing OFDM modulation. FIG. 5 shows a receiver 500 for a system employing any one of a number of modulation schemes known in the art. As shown in FIG. 5, receiver 500 includes demodulator 501, minimum mean square error (MMSE) estimator 504, and MIMO demapper 502 receiving at least $N_r$ signals, $N_r$ an integer greater than 1, from corresponding receive antennas 503(1)–503($N_r$). Parallel-to-serial converter 507, bit interleaver 508, MAP decoder 509, bit interleaver 510, and serial-to-parallel converter 511 operate in a similar manner to like components of FIG. 3. MMSE estimator 504, MIMO demapper 502, MAP decoder 509 implement a method of reduced-complexity iterative demapping/decoding for LLR calculation as described below.

For the receiver of FIG. 5, the system model employs the following definitions for demapper operations that compute the LLR for the information bit. The bit $b_k^n$ is the bit that is mapped to the nth bit position (n=1, 2, ..., $N_tM$) in the input symbol vector $x_k$. For example, the ith input symbol $x_k^i$ is mapped by the input bits $b_k^{(l-1)M+1}, b_k^{(l-1)M+2}, \ldots, b_k^{lM}$. The LLR value $L(b_k^n)$ represents the LLR value for the bit $b_k^n$. To distinguish the LLR values of MIMO demapper 502 from the LLR values of MAP decoder 509, the notation $L^m(b_k^n)$ and $L^c(b_k^n)$ are used, respectively. The extrinsic information provided to the demapper is defined as $L_c^e(b_k^n)$ for the bit $b_k^n$.

The set $S_d^n$, $d=\pm 1$, is the set of all symbol vectors with a +1 or a −1 value of bit $b_k^n$. Column vector $b_k$ has elements representing bits $b_k^n$, and column vector $L_k^e$ has elements corresponding to the extrinsic information $L_c^e(b_k^n)$ (difference of a priori and a posteriori LLR values) from the MAP decoder 509.

During the first iteration, the present method identifies "reliable" bit decisions for computation of demapper a posteriori LLR values, and those reliable bit positions are subsequently fixed as hard decisions. Since the demapping process of the first iteration does not have any a priori information available, an MMSE estimation filter $w_k$ is applied to the received signal (observations or samples) $y_k$ to get an MMSE estimate vector $\hat{x}_k$ of the transmitted vector $x_k$ (a vector of the transmitted symbols $x_k^l$ at time k). Thus, MMSE estimation minimizes estimation error defined as in equation (11):

$$e_k^l = x_k^l - w_{k,l}^* y_k \qquad (11)$$

where $w_{k,l}$ is a column vector of length $N_r$ for estimating $x_k^l$.

Defining $e_k$ as a column vector of length $N_t$ comprised of the estimation error $e_k^l$, the combination of column vectors $w_k$ into a $N_r$ by $N_t$ matrix may generate an optimum estimation matrix $W_k$ that minimizes the mean square error $E\|e_k\|^2$. The optimum estimation matrix $W_k$ may be defined as in equation (12):

$$W_k = (H_k H_k^* + \alpha I)^{-1} H_k \qquad (12)$$

where $\alpha$ is defined as in equation (13):

$$\alpha = \frac{1}{SNR} = \frac{N_0}{E_s}. \qquad (13)$$

Using a well-known matrix inversion rule, equation (12) may be expressed as in equation (14):

$$W_k = H_k (H_k^* H_k + \alpha I)^{-1}. \qquad (14)$$

Therefore, the MMSE estimate vector $\hat{x}_k$ for symbols $x_k$ is obtained through evaluation of equation (15):

$$\hat{x}_k = W_k^* y_k = (H_k^* H_k + \alpha I)^{-1} H_k^* y_k. \qquad (15)$$

The covariance matrix $R_e$ of the estimation error $e_k = x_k - \hat{x}_k$ is expressed as in equation (16):

$$R_e = E(e_k e_k^*) = N_0 (H_k^* H_k + \alpha I)^{-1}. \qquad (16)$$

Once the quantity $(H_k^* H_k + \alpha I)^{-1}$ is obtained, both the MMSE estimation filter $W_k$ and the covariance matrix $R_e$ are easily computed.

Next, tentative decisions for the transmitted bits are generated based on the MMSE estimates. Denoting $\hat{L}(b_k^n)$ as the soft output value based on the MMSE estimation $\hat{x}_k$, the soft output value $\hat{L}(b_k^n)$ for each bit $b_k^n$ may be computed using equation (17):

$$\hat{L}(b_k^n) = \log \frac{P(b_k^n = +1 \mid \hat{x}_k)}{P(b_k^n = -1 \mid \hat{x}_k)} = \log \frac{\sum_{x_k \in S_{+1}^n} p(\hat{x}_k \mid x_k)}{\sum_{x_k \in S_{-1}^n} p(\hat{x}_k \mid x_k)}. \qquad (17)$$

Equation (17) for the general receiver structure may be related to equation (6) of the OFDM system since the index n is equivalent to iM+m.

At high signal-to-noise ratios (SNR), the MMSE estimation approaches a zero forcing (ZF) solution, and may be approximated by a variable having complex Gaussian distribution. Thus, by applying the Gaussian probability density function approximation and normalizing, the joint probability $p(\hat{x}_k \mid x_k)$ is defined as in equation (18):

$$p(\hat{x}_k \mid x_k) = \exp\left(-\frac{(\hat{x}_k - x_k)^* R_e^{-1} (\hat{x}_k - x_k)}{2}\right). \qquad (18)$$

If the MMSE estimates $\hat{x}_k^l$ are uncorrelated with each other, the correlation matrix $R_e$ becomes a diagonal matrix with $\sigma_i^2$ being the ith diagonal element of the matrix. Denoting $\sigma_i^2$ as the variance of the ith MMSE estimate $\hat{x}_k^l$, then the joint probability $p(\hat{x}_k \mid x_k)$ of equation (18) may be expressed as in equation (19):

$$p(\hat{x}_k \mid x_k) = \prod_{i=1}^{N_t} \exp\left(-\frac{1}{2\sigma_i^2} |\hat{x}_k^i - x_k^i|^2\right). \qquad (19)$$

With equation (19), the LLR computation may be performed with a single scalar symbol instead of a vector. For $n=(i-1)M+2, (i-1)M+2, \ldots, iM$, the notation $b_k^{n|i}$ to indicate that the nth bit position falls into ith symbol. After canceling out symbols unrelated to $b_k^{n|i}$, the LLR computation of equation (17) may be expressed as in equation (20):

$$L^m(b_k^{n|i}) = \log \frac{\sum_{x_k^j \in M_{+1}^{n|i}} \exp\left(-\frac{1}{2\sigma_i^2} |\hat{x}_k^i - x_k^j|^2\right)}{\sum_{x_k^j \in M_{-1}^{n|i}} \exp\left(-\frac{1}{2\sigma_i^2} |\hat{x}_k^i - x_k^j|^2\right)} \qquad (20)$$

where the set $M_d^{n|i}$ is defined as in equation (21):

$$M_d^{n|i} = \{x_k^l \mid b_k^{n|i} = d\}. \qquad (21)$$

With equations (20) and (21), the number of evaluations (candidates to search) is reduced to $2^M$. By applying the max-log approximation to equation (20), the computation of LLR is further reduced. Given the MMSE estimate $\hat{x}_k$, the simplified scheme transforms the M-dimensional search over likelihood values for all sequences into simple M boundary problems.

Even though the LLR values for all the transmitted bits may be obtained by a method employing equations (20) and (21), this LLR computation is employed to determine those bits whose decisions may be considered "reliable" to further reduce the number of evaluations.

If a number P of bit positions, $n_1, n_2, \ldots n_P$ are identified as having LLR values computed in equation (20) that are reliable, the corresponding LLR values $L(b_k^{n_1}), L(b_k^{n_2}), \ldots L(b_k^{n_P})$ meet or exceed a threshold. Defining $\check{b}_k^{n_1}, \check{b}_k^{n_2}, \ldots \check{b}_k^{n_P}$ as the hard decisions for the bits made by slicing soft output values corresponding to these LLR values, then the set $L^P$ is defined as a set of all symbol vectors with bits in those positions equal to the hard decisions. The set $L^P$ is defined as in equation (22):

$$L^P = \{x_k | b_k^{n_1} = \check{b}_k^{n_1}, b_k^{n_2} = \check{b}_k^{n_2}, \ldots b_k^{n_P} = \check{b}_k^{n_P}\}. \tag{22}$$

As a result, a candidate search for combinations of equation (7) is carried out over a smaller set $L^P \cap S_d^n$. The size of the set that the demapper needs to search over is reduced $2^{N_t M-P}$.

Identification of the P most reliable bit positions is now described. If incorrect hard decisions are employed within a candidate set $L^P$, overall performance degrades due to error propagation in the MIMO demapper. Thus, the bit positions included in the candidate set $L^P$ are selected so as to minimize the probability of error by choosing the bit positions with the largest LLR values.

Considering that hard decisions $\check{b}_k^n$ are obtained by slicing the estimate $\hat{x}_k^l$, the probability of error $P_e$ in $\check{b}_k^n$ is dependent on the probability of estimation error of $\hat{x}_k^l$. Therefore, the probability $P_c$ that the hard decision $\check{b}_k^n$ is correct may be expressed as in equation (23):

$$P_c = (1 - P_e) P\{b_k^l = \check{b}_k^n\} \tag{23}$$

where $P_e$ is the probability that the MMSE estimate $\hat{x}_k^l$ results in an incorrect decision. Denoting $Q(\bullet)$ as the complementary error function, $P_c$ may be computed via equation (24):

$$P_c \approx N_c Q\left(\frac{d_{\min}}{2\sigma_i}\right), \tag{24}$$

where $N_c$ represents the average number of nearest neighbors, and $d_{\min}$ is the minimum Euclidean distance for a constellation. Both $N_c$ and $d_{\min}$ may be determined a priori from the given constellation. For example, $N_c = 3$ and $d_{\min} = 2$ for 16-QAM with symbol energy $E_s = 10$.

Therefore, using the relationship between $L(b_k^n)$ and $P\{b_k^n = \check{b}_k^n\}$, the overall probability $P_c$ of correct decision is given by equation (25):

$$P_c \approx \left(1 - N_c Q\left(\frac{d_{\min}}{2\sigma_i}\right)\right) \frac{1}{1 + e^{-|L^m(b_k^n)|}}. \tag{25}$$

Further simplification can be made by using an approximation of $Q(\bullet)$ as given in equation (26):

$$Q(x) \approx \frac{1}{\sqrt{2\pi x}} e^{-\frac{x^2}{2}}. \tag{26}$$

To determine the P most reliable bit positions, we compute the probability of correct decision for each bit position using the relation of equation (25), and choose the P bit positions with the largest $P_c$. After identifying the P bit positions, equations (6) and (7) are modified to compute the LLR values over the set $L^P \cap S_d^n$.

Once the MIMO demapper generates the LLR values using the technique described above for the first iteration, the MAP decoder may produce soft output values for the transmitted bits for the first iteration and subsequent iterations. Therefore, the same principle of fixing hard decisions in the MIMO demapper in the subsequent iterations is employed to reduce the size of a set of candidates to search.

Figure 6:
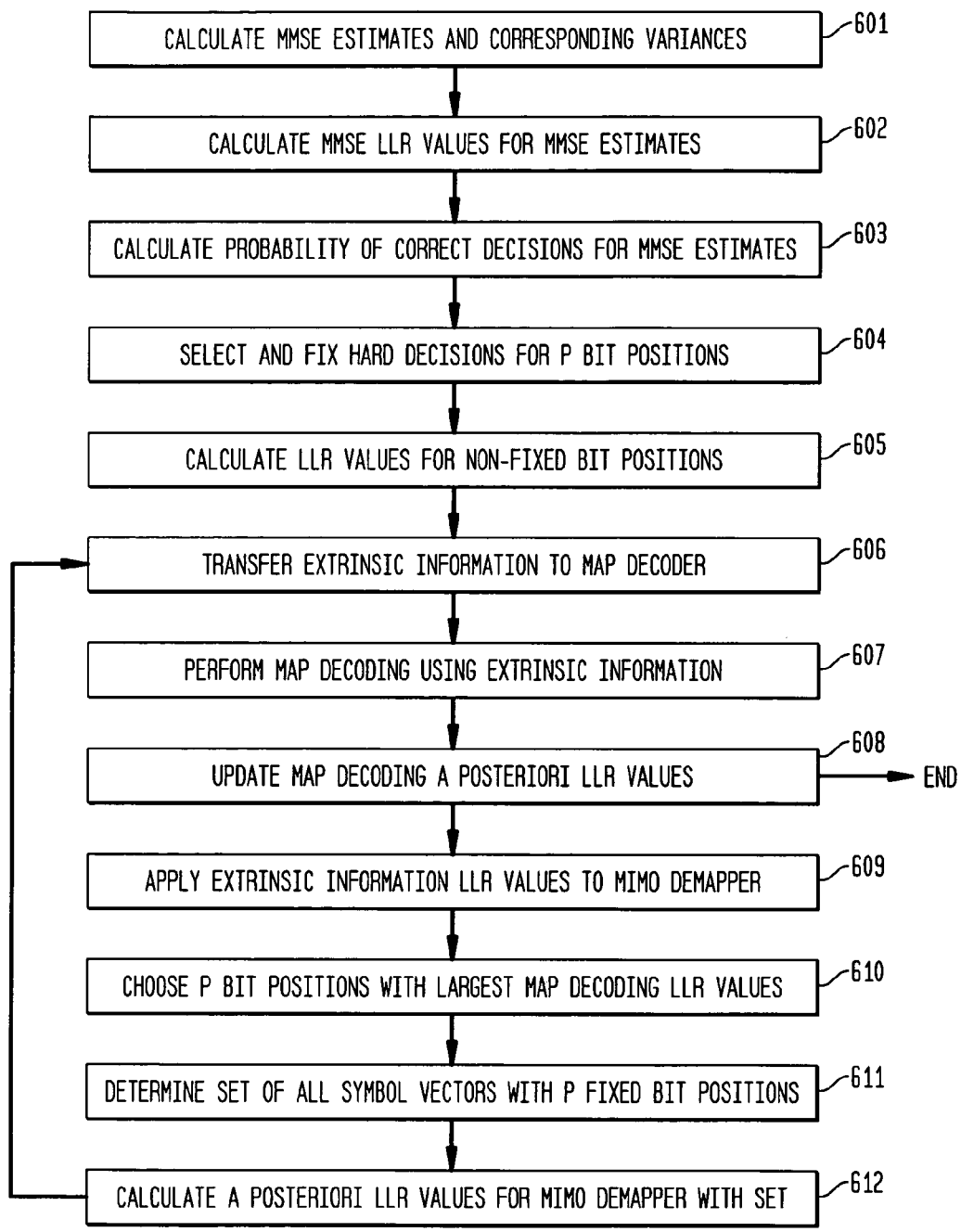
FIG. 6 shows an exemplary method of reduced complexity iterative demapping/decoding.

FIG. 6 shows an exemplary method of reduced complexity iterative demapping/decoding for LLR calculation. At step 601, the MIMO demapper begins the first iteration of demapping/decoding. For each i, the MMSE estimate $\hat{x}_k^l$ is obtained using equation (15), and the corresponding MSE variance $\sigma_i^2$ is obtained using equation (16). At step 602, the MIMO demapper employs the MMSE estimates $\hat{x}_k^l$ and the corresponding MSE variances $\sigma_i^2$ to compute MMSE LLR values $L^m(b_k^n)$ are computed using equations (20) and (21). At step 603, the probabilities of correct decisions are then computed using equation (25). At step 604, the P positions with the largest $P_c$ as calculated from equation (25) are selected, and those bit positions are fixed with the corresponding hard decision. At step 605, the LLR values for every bit position (except the fixed positions) are computed in equations (6) and (7) over a set with a reduced size $2^{N_t M-P}$.

After the MIMO demapper computes the LLR values in step 605, at step 606 the extrinsic information is transferred to the MAP decoder (after deinterleaving). At step 607, the MAP decoder performs an iteration of MAP decoding. Then, at step 608, the MAP decoder updates its a posteriori LLR values $L^e(b_k^n)$ for the transmitted bits $b_k^n$, unless the last iteration is reached in which the method terminates. At step 609, the extrinsic information LLR values $L^e(b_k^n)$ (by subtracting the input a priori LLR values from the a posteriori LLR values) are applied to the MIMO demapper (after interleaving).

Even though the extrinsic information $L^e(b_k^n)$ is employed by the MIMO demapper, the overall LLR value $L^e(b_k^n)$ for the bit from MAP decoding is preferably used to determine the P most reliable bit positions. Therefore, in the second iteration (and the subsequent iterations), at step 610, the MIMO demapper chooses those P bit positions with the largest magnitude MAP decoder LLR values $|L^e(b_k^n)|$, and then at step 611, a set $L^P$ is determined based on those P fixed bit positions.

At step 612, the LLR values of the MIMO demapper for bit positions except for those P fixed positions are computed via equation (27):

$$L^m(b_k^n) = \log \frac{\sum_{x_k \in L^P \cap S_{+1}^n} \exp\left(-\frac{1}{N_0} \|y_k - H_k x_k\|^2 + \frac{1}{2} b_k^T L_k^e\right)}{\sum_{x_k \in L^P \cap S_{-1}^n} \exp\left(-\frac{1}{N_0} \|y_k - H_k x_k\|^2 + \frac{1}{2} b_k^T L_k^e\right)}. \tag{27}$$

After step 612, the method returns to step 606.

As is known in the art, the logarithm of a summation of exponential terms may be approximated by taking only the maximum value of the exponent. Therefore, the probability of a bit decision may be determined through equation (28):

$$P(b_k^n = d | y_k, H_k) \approx \max_{x_k \in L^P \cap S_d^n} \left(-\frac{1}{N_0} \|y_k - H_k x_k\|^2 + \frac{1}{2} b_k^T L_k^e\right) \tag{28}$$

A system operating in accordance with an embodiment of the present invention may provide the following advantages.

Space time bit-interleaved coded modulation (ST-BICM) in wireless LAN applications is flexible in various system configurations. Unlike other space-time coded systems of the prior art in which coding and modulation design was specified for each system setup, a single coder in a ST-BICM system operating in accordance with an exemplary embodiment of the present invention may support many different data rates. Support of multiple, varying data rates may be advantageous for wireless LAN system design where, for example, eight different data rate modes are defined in the 802.11a standard.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method of iteratively demapping and decoding two or more received signals into data, the method comprising the steps of:

for a first iteration, (a) demapping, with a multi-input, multi-output (MIMO) demapper, a sequence of encoded data from the received signals as a set of minimized cost function error (MCFE) estimates;

(b) generating MCFE likelihood values for the set of MCFE estimates based on a set of corresponding variances;

(c) calculating, for the set of MCFE estimates, a set of probabilities of correct decision based on the MCFE likelihood values;

(d) setting fewer than all of the estimates in the set of MCFE estimates as hard decisions based on the set of probabilities of correct decision; and (e) calculating a set of maximum a posteriori (MAP) likelihood values based on the one or more MCFE estimates not set as hard decisions in step (d).

2. The invention of claim 1, wherein step (a) includes the step of generating a set of bit estimates for the sequence of encoded data, and the method further comprising the steps of:

during the first iteration, (f) MAP decoding the set of bit estimates for the sequence of encoded data based on the extrinsic information generated from the MAP likelihood values of step (e), the step of MAP decoding including the step of generating MAP decoding extrinsic information; and (g) applying the MAP decoding extrinsic information to the MIMO demapper.

3. The invention of claim 2, further comprising the steps of, during a second iteration, (h) setting fewer than all of the estimates in the set of bit estimates as hard decisions based on the MAP decoding extrinsic information of step (f);

(i) calculating, by the MIMO demapper, a set of new MAP likelihood values based on the one or more bit estimates not set as hard decisions in step (h) and the MAP decoding extrinsic information; and (j) MAP decoding the set of bit estimates based on the set of new MAP likelihood values to update the MAP decoding extrinsic information.

4. The invention of claim 3, further comprising the step of repeating steps (j) through (k) to generate user data from the encoded data.

5. The invention of claim 1, wherein, for step (a), the MCFE estimates are minimum mean square error (MMSE) estimates formed as a vector $\hat{x}_k$ corresponding to a transmitted symbol vector $x_k$, the vector $\hat{x}_k$ formed by the step of evaluating:

$$\hat{x}_k = W^*_k y_k = (H^*_k H_k + \alpha I)^{-1} H^*_k y_k,$$

wherein $W_k$ is an optimum estimation matrix, $\alpha$ is a scaling factor related to a signal to noise ratio, I is the identity matrix, $H_k$ is a channel function estimate matrix, and $y_k$ is an input sample vector representing the received signals.

6. The invention of claim 5, wherein, for step (b) the variances are diagonal elements of covariance matrix $R_e$ of estimation error vector $e_k = x_k - \hat{x}_k$ generated by the step of evaluating:

$$R_e = E(e_k e^*_k) = N_0 (H^*_k H_k + \alpha I)^{-1},$$

wherein $N_0$ is related to a noise power of the input sample vector.

7. The invention of claim 5, wherein, for step (b) the MCFE likelihood values are minimum mean square error (MMSE) likelihood values $\hat{L}(b_k^n)$ for each transmit bit $b_k^n$ generated by the step of evaluating:

$$\hat{L}(b_k^n) = \log \frac{P(b_k^n = +1 \mid \hat{x}_k)}{P(b_k^n = -1 \mid \hat{x}_k)} = \log \frac{\sum_{x_k \in S_{+1}^n} p(\hat{x}_k \mid x_k)}{\sum_{x_k \in S_{-1}^n} p(\hat{x}_k \mid x_k)},$$

wherein $x_k \in S_{+1}^n$ is defined as a sequence for a kth subchannel having a bit estimate for bit $b_k^n$ corresponding to the user symbol, and $x_k \in S_{-1}^n$ is similarly defined for the kth subchannel having an estimate for bit $b_k^n$ corresponding to the complement of the user symbol, and wherein the joint probability $p(\hat{x}_k \mid x_k)$ may be expressed:

$$p(\hat{x}_k \mid x_k) = \prod_{i=1}^{N_i} \exp\left(-\frac{1}{2\sigma_i^2} |\hat{x}_k^i - x_k^i|^2\right).$$

8. The invention of claim 7, wherein, for step (c), each probability $P_c$ of correct decision is given by:

$$P_c \approx \left(1 - N_c Q\left(\frac{d_{\min}}{2\sigma_i}\right)\right) \frac{1}{1 + e^{-|L^m(b_k^n)|}},$$

wherein $Q(\bullet)$ is a complementary error function, $N_c$ represents an average number of nearest neighbors, $\sigma_i$ is a variance corresponding to the ith MMSE estimate, $L^m(b_k^n)$ represents an a posteriori log-likelihood ratio of transmit bit $b_k^n$, and $d_{\min}$ is a minimum distance between user symbols for a constellation.

9. The invention of claim 1, wherein the method is embodied in a receiver.

10. The invention of claim 1, wherein the method is embodied in a processor and circuitry of an integrated circuit.

11. A computer-readable medium having stored thereon a plurality of instructions, the plurality of instructions including instructions which, when executed by a processor, cause the processor to implement a method for iteratively demapping and decoding two or more received signals into data, the method comprising the steps of:

for a first iteration, (a) demapping, with a multi-input, multi-output (MIMO) demapper, a sequence of encoded data from the received signals as a set of minimized cost function error (MCFE) estimates;

(b) generating MCFE likelihood values for the set of MCFE estimates based on a set of corresponding variances;

(c) calculating, for the set of MCFE estimates, a set of probabilities of correct decision based on the MCFE likelihood values;

(d) setting fewer than all of the estimates in the set of MCFE estimates as hard decisions based on the set of probabilities of correct decision; and (e) calculating a set of maximum a posteriori (MAP) likelihood values based on the one or more MCFE estimates not set as hard decisions in step (d).

12. The invention of claim 11, wherein step (a) includes the step of generating a set of bit estimates for the sequence of encoded data, and the method further comprising the steps of:

during the first iteration, (f) MAP decoding the set of bit estimates for the sequence of encoded data based on the extrinsic information generated from the MAP likelihood values of step (e), the step of MAP decoding including the step of generating MAP decoding extrinsic information; and (g) applying the MAP decoding extrinsic information to the MIMO demapper.

13. The invention of claim 12, further comprising the steps of, during a second iteration, (h) setting fewer than all of the estimates in the set of bit estimates as hard decisions based on the MAP decoding extrinsic information of step (f);

(i) calculating, by the MIMO demapper, a set of new MAP likelihood values based on the one or more bit estimates not set as hard decisions in step (h) and the MAP decoding extrinsic information; and (j) MAP decoding the set of bit estimates based on the set of new MAP likelihood values to update the MAP decoding extrinsic information.

14. The invention of claim 13, further comprising the step of repeating steps (h) through (j) to generate user data from the encoded data.

15. A method of iteratively demapping and decoding two or more received signals into data, the method comprising the steps of:

for a first iteration, (a) demapping, with a multi-input, multi-output (MIMO) demapper, a sequence of encoded data from the received signals as a set of minimized cost function error (MCFE) estimates;

(b) generating MCFE likelihood values for the set of MCFE estimates based on a set of corresponding variances;

(c) calculating, for the set of MCFE estimates, a set of probabilities of correct decision based on the MCFE likelihood values;

(d) setting one or more of the set of MCFE estimates as hard decisions based on the set of probabilities of correct decision; and (e) calculating a set of maximum a posteriori (MAP) likelihood values based on the remaining MCFE estimates;

wherein, for step (c), each probability $P_c$ of correct decision is given by:

$$P_c \approx \left(1 - N_c Q\left(\frac{d_{\min}}{2\sigma_i}\right)\right) \frac{1}{1 + e^{-|L^m(b_k^n)|}},$$

wherein $Q(\bullet)$ is a complementary error function, $N_c$ represents an average number of nearest neighbors, $\sigma_i$ is a variance corresponding to the ith MCFE estimate, $L^m(b_k^n)$ represents an a posteriori log-likelihood ratio of transmit bit $b_k^n$, and $d_{\min}$ is a minimum distance between user symbols for a constellation.

16. The invention of claim 15, wherein, for step (a), the MCFE estimates are minimum mean square error (MMSE) estimates formed as a vector $\hat{x}_k$ corresponding to a transmitted symbol vector $x_k$, the vector $\hat{x}_k$ formed by the step of evaluating:

$$\hat{x}_k = W^*_k y_k = (H^*_k H_k + \alpha I)^{-1} H^*_k y_k,$$

wherein $W_k$ is an optimum estimation matrix, $\alpha$ is a scaling factor related to a signal to noise ratio, $I$ is the identity matrix, $H_k$ is a channel function estimate matrix, and $y_k$ is an input sample vector representing the received signals.

17. The invention of claim 16, wherein, for step (b) the MCFE likelihood values are minimum mean square error (MMSE) likelihood values $\hat{L}(b_k^n)$ for each transmit bit $b_k^n$ generated by the step of evaluating:

$$\hat{L}(b_k^n) = \log \frac{P(b_k^n = +1 \mid \hat{x}_k)}{P(b_k^n = -1 \mid \hat{x}_k)} = \log \frac{\sum_{x_k \in S_{+1}^n} p(\hat{x}_k \mid x_k)}{\sum_{x_k \in S_{-1}^n} p(\hat{x}_k \mid x_k)},$$

wherein $x_k \in S_{+1}^n$ is defined as a sequence for a kth subchannel having a bit estimate for bit $b_{k,n}$ corresponding to the user symbol, and $x_k \in S_{-1}^n$ is similarly defined for the kth subchannel having an estimate for bit $b_k^n$ corresponding to the complement of the user symbol, and wherein the joint probability $P(\hat{x}_k | x_k)$ may be expressed:

$$p(\hat{x}_k \mid x_k) = \prod_{i=1}^{N_i} \exp\left(-\frac{1}{2\sigma_i^2} |\hat{x}_k^i - x_k^i|^2\right).$$

* * * * *